United States Patent Office 2,823,188
Patented Feb. 11, 1958

2,823,188

PLASTIC MATERIALS COMPRISING DEXTRAN AND METHOD OF PREPARATION

Leo J. Novak, Dayton, Ohio, assignor to The Commonwealth Engineering Company of Ohio, Dayton, Ohio, a corporation of Ohio No Drawing. Application June 7, 1954
Serial No. 435,097

18 Claims. (Cl. 260—9)

This invention relates to new and useful plastic materials.

The primary object of this invention is to provide new plastic materials comprising dextran.

This and other objects are accomplished by reacting unsaturated polycarboxylic acid or functional derivatives thereof such as the acid anhydride, a polyhydric alcohol, and dextran together under heating until a plastic, resinous mass is obtained which, on cooling, sets to a hard, clear product.

Dextran is a high molecular weight polysaccharide made up of anhydroglucopyranosidic units joined by molecular structural repeating alpha-1,6 and non-alpha-1,6 linkages, at least 50% of these linkages being, apparently, of the alpha-1,6 type. The polysaccharide may be obtained in various ways, as by bacterial conversion of 1,4 linkages of dextrin to 1,6 linkages of dextran, but is usually biosynthesized from sucrose by the action of dextran-producing microorganisms such as those of the *Leuconostoc mesenteroides* or *L. dextranicum* types, or the enzymes thereof. Thus, an aqueous sucrose-bearing nutrient medium of appropriate composition may be inoculated with a culture of the selected microorganism and the mass incubated until the dextran is bisoynthesized in maximum yield. Or the culture of the bacterium may be filtered to separate the enzyme dextransucrase therefrom and the filtrate, the enzyme isolated from it, or an aqueous solution of the isolated enzyme of suitable potency, may be introduced into the sucrose-bearing nutrient and the mass held until the dextran is produced. Under normal conventional conditions the "native" dextran thus obtained has a very high molecular weight calculated to be in the millions and may vary widely with respect to other properties including the molecular structural repeating alpha-1,6 to non-alpha-1,6 linkages ratios, water-sensitivity and osmotic pressure in liquids, depending on the microorganism used.

The "native" high molecular weight dextran may be used as co-reactant in producing the new plastics of the invention or it may be partially hydrolyzed in any suitable way to dextran of lower molecular weight to obtain the dextran component. In general, the dextran component may have a molecular weight of 5000 to $150 \times 10^6$ determined by light scattering measurements, a molecular structural repeating alpha-1,6 to non-alpha-1,6 linkages ratio of 1.9:1 to 30:1, and may be readily soluble in water, more difficultly water-soluble or substantially water-insoluble. Microorganisms which may be used to produce the native dextran include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139. As stated, the normally high molecular weight native dextran may be partially degraded to lower molecular weight dextran. Also, the conditions of the biosynthesis may be conducted under controlled conditions such that the dextran as produced has a molecular weight that is lower than the molecular weight of the native dextran produced under conventional conditions.

The dextran may be recovered from the fermentate by precipitation using a water-miscible aliphatic alcohol or ketone, purified and reduced to particulate condition for reaction with the polycarboxylic acid and polyhydric alcohol.

The polyhydric alcohol used in preparing the new resins may be, for example, ethylene glycol, di-, tri-, or tetraethylene glycol, propylene glycol, dipropylene glycol, trimethylene glycol, glycerol or pentaerythritol. Examples of the unsaturated polycarboxylic acids which may be used include maleic, fumaric, phthalic chlormaleic, chlorofumaric, citraconic, methylethyl maleic, diethyl maleic, chloro-methyl maleic and mesaconic acids.

The plastic masses may be prepared by heating the monomers together to obtain a resinous melt which sets to hard condition on cooling. While the product is in the resinous liquid state it may be molded to any desired shape, with heating, and with or without pressure. Temperatures of 100° C. to 300° C. may be used to effect the reaction. At temperatures of 50° C. to 300° C. the reaction product is usually sufficiently soft and plastic to permit of shaping thereof.

The relative proportions of the respective components may be varied, and either the polycarboxylic acid or polyhydric alcohol may predominate, the dextran being, usually, used in relatively minor amount. In general, the plastic or resinous products are obtained by heating a mixture of, by weight, from 30% to 75% of the polycarboxylic acid or anhydride thereof, from 15% to 60% of the polyhydric alcohol, and from 5% to 25% of the dextran, the total of these ingredients equalling 100%. The three components may be mixed together directly, or the dextran, or a portion thereof, may be dissolved or dispersed in the polyhydric alcohol with heating, and the solution or dispersion added to the liquid acid or anhydride, the mass being then heated with agitation to reaction temperature and until a homogeneous resinous, viscous but fluid mass is obtained. At ordinary temperatures the reaction products are insoluble in water and such solvents as ethyl alcohol, aqueous sodium carbonate, aqueous sodium hydroxide, formamide and glycerine but may form colloidal solutions in water and the other solvents mentioned under heating. The products may be soluble at ordinary temperature in 10% aqueous sodium carbonate, 10% aqueous sodium hydroxide, acetone, acetic acid, dioxane, and ethylene glycol monoethyl ether or form colloidal solutions in those solvents at elevated temperatures. Solutions of the new materials may be formed into articles of the desired shape followed by cooling to set them in the shaped condition, or the solutions may be used as coating, impregnating and laminating or bonding compositions.

The following examples, in which parts are by weight unless otherwise stated, are given to illustrate specific embodiments of the invention, it being understood that these examples are not intended to be limitative.

*Example I*

About 14.3 parts of particulate B–512 dextran (average M. W. about 30,000) was dissolved in 40.4 parts of hot glycerol, and the hot solution was added to 45.3 parts of melted maleic anhydride. The mass was boiled for 10–15 minutes with continuous stirring, and then cooled. During the cooling, the mass solidified to a clear, light amber, resinous substance. The resin was soluble in hot 10% aqueous sodium carbonate, hot 10% aqueous sodium hydroxide, hot acetic acid, hot formamide, and hot glycerol, slightly soluble in hot ethyl alcohol and acetone, and slightly soluble in cold water and ethylene glycol monoethyl ether.

Example II

About 32.5 parts of particulate B–512 dextran (M. W. 30,000) were divided into two equal portions. One of the portions was dissolved in 16.2 parts of hot glycerol, and the other portion was mixed with 51.3 parts of melted maleic anhydride. The hot glycerol solution was then combined with the dextran-maleic anhydride mixture, and the mass was heated for 12 minutes with constant stirring and until a clear, homogeneous solution formed. On cooling, the solution hardened to a clear, light amber mass. The resin was insoluble in water, soluble in hot 10% aqueous sodium carbonate, hot aqueous sodium hydroxide, hot acetic acid, hot formamide, hot glycerol and hot ethylene glycol monoethyl ether, slightly soluble in hot ethanol, and soluble in acetone and dioxane.

Example III

The procedure of Example II was repeated, except that the mass was heated for 20 minutes, during which it became spongy in consistency. On cooling, the mass set to hard, porous condition. The resin was slightly soluble in water and 10% aqueous sodium carbonate, soluble in hot ethanol, hot 10% aqueous sodium hydroxide, hot acetone, hot acetic acid, hot dioxane, hot formamide, hot glycerol and hot ethylene glycol monoethyl ether.

Example IV

About 11.6 parts of particulate B–512 dextran (average M. W. about 30,000) were dissolved in 52 parts of hot ethylene glycol and the hot solution was added to 36.4 parts of melted maleic anhydride. The mass was boiled for 15 minutes. On cooling, it set to a clear amber resin, which was insoluble in water and acetone, soluble in hot ethanol, hot 10% aqueous sodium hydroxide, hot acetic acid, hot dioxane, hot formamide and hot glycerol, and slightly soluble in hot 10% aqueous sodium carbonate and hot ethylene glycol monoethyl ether.

Example V

Example IV was repeated except that 51.3 parts of maleic anhydride were used. The resin was insoluble in water, soluble in 10% aqueous sodium carbonate, 10% aqueous sodium hydroxide, acetone, acetic acid, dioxane and ethylene glycol monoethyl ether, soluble in hot ethanol, and slightly soluble in formamide and glycerol.

Example VI

Example IV was repeated, using 11.6 parts of particulate B–512 dextran having a molecular weight of 20,000 to 200,000 (average 60,000 to 80,000). The resin, which was a hard, clear amber material, was insoluble in water, ethanol, acetone, dioxane, ethylene glycol monoethyl ether and glycerol, soluble in hot aqueous 10% sodium carbonate and hot formamide, and slightly soluble in 10% aqueous sodium hydroxide and acetic acid.

Example VII

Example IV was repeated, using 11.6 parts of particulate native (unhydrolyzed) B–512 dextran. The resin, which set to hard, clear amber condition on cooling, was insoluble in water, ethyl alcohol and glycerol, soluble in hot 10% aqueous sodium carbonate, 10% aqueous sodium hydroxide, and hot formamide, slightly soluble in hot acetone, hot acetic acid, hot dioxane and hot ethylene glycol monoethyl ether.

Example VIII

Example IV was repeated, using 11.6 parts of particular native B–523 dextran. The cooled and hardened resin was of granular consistency. It was soluble in the following hot solvents: water, ethanol, 10% aqueous sodium carbonate, acetone, acetic acid, dioxane, formamide, ethylene glycol monoethyl ether and glycerol, and slightly soluble in 10% aqueous sodium hydroxide.

Example IX

Example IV was repeated, using 11.6 parts of particulate B–1254 native dextran. The hardened, clear amber resin was slightly soluble in 10% aqueous sodium carbonate, 10% aqueous sodium hydroxide and acetone, and soluble in the following hot solvents: water, ethanol, acetic acid, dioxane, formamide, glycerol and ethylene glycol monoethyl ether.

Example X

Example IV was repeated, using 11.6 parts of particulate B–1146 native dextran. The clear amber, hardened resin was slightly soluble in water, ethanol, acetone, ethylene glycol monoethyl ether and glycerol, and soluble in hot 10% aqueous sodium carbonate, 10% aqueous sodium hydroxide, acetic acid, dioxane, and formamide.

Example XI

About 10.7 parts of particulate B–512 dextran (average M. W. 30,000) were mixed with 55.3 parts of propylene glycol. The resulting gummy mass was added to 34 parts of melted maleic anhydride and the mix was boiled for 25 minutes. On cooling, the terpolymer solidified to a dark amber resinous mass which was soluble in hot 10% aqueous sodium hydroxide, hot acetic acid, hot dioxane, hot formamide and hot ethylene glycol monoethyl ether and slightly soluble in hot water, hot ethanol, hot 10% aqueous sodium carbonate, and hot glycerol.

Example XII

About 8 parts of particulate B–512 dextran (M. W. 30,000) were mixed with 16 parts of hot glycerol and the mixture was added to 76 parts of melted phthalic anhydride. The mix was boiled for 25 minutes, and then cooled to a hard, dark-colored resin which was insoluble in water, slightly soluble in ethyl alcohol, soluble in acetone, and dioxane and in the following hot solvents: 10% aqueous sodium carbonate, 10% aqueous sodium hydroxide, acetic acid, formamide, glycerol and ethylene glycol monoethyl ether.

Example XIII

About 14.8 parts of particulate B–512 dextran (M. W. 30,000) were mixed with 14.8 parts of hot glycerol and the mixture was added to 70.4 parts of melted phthalic anhydride. The mix was boiled for 25 minutes and then cooled to a dark, hard, resinous mass insoluble in water, soluble in 10% aqueous sodium carbonate, 10% aqueous sodium hydroxide, acetone, acetic acid, dioxane and ethylene glycol monoethyl ether and in hot ethanol, and slightly soluble in formamide and glycerol.

Example XIV

About 24.2 parts of particulate B–512 dextran (M. W. 30,000) were mixed with 47.5 parts of hot glycerol and the mixture was added to 28.3 parts of melted phthalic anhydride. On boiling the mix for 25 minutes and then cooling it, a dark, resinous mass was obtained. It was soluble in hot ethanol, 10% aqueous sodium hydroxide, acetone, acetic acid, dioxane, formamide, ethylene glycol monoethyl ether and glycerol, slightly soluble in water and 10% aqueous sodium carbonate.

Example XV

About 10 parts of B–512 dextran (M. W. 30,000) were dissolved in 46.5 parts of hot glycerol and the solution was added to 44.5 parts of melted phthalic anhydride. A brown, molasses-type polymer was obtained. It was insoluble in water, soluble in hot ethanol, 10% aqueous sodium hydroxide, acetic acid, dioxane, formamide and glycerol, slightly soluble in hot 10% aqueous sodium carbonate and ethylene glycol monoethyl ether.

Example XVI

About 10.5 parts of particulate B–512 dextran (M. W. 30,000) were mixed with 44 parts of hot ethylene glycol and the mixture was added to 46.5 parts of melted phthalic anhydride. On boiling for 25 minutes and cooling a dark, taffy-like resinous material was obtained. It was insoluble in water, soluble in 10% aqueous sodium hydroxide, acetone, and formamide, slightly soluble in ethanol, soluble in hot 10% aqueous sodium carbonate, glycerol and ethylene glycol monoethyl ether and slightly soluble in hot acetic acid and dioxane.

Example XVII

About 7 parts of particulate B–512 dextran (M. W. 30,000), 59 parts of propylene glycol and 34 parts of phthalic anhydride were heated together and then boiled for 15 minutes with constant stirring. On cooling, a hard, dark-colored, plastic material similar to "Bakelite" was obtained. It was insoluble in water, 10% aqueous sodium carbonate, 10% aqueous sodium hydroxide and glycerol, soluble in acetone, acetic acid, and in hot ethanol, dioxane, formamide and ethylene glycol monoethyl ether.

Instead of the maleic anhydride and phthalic anhydride used in the specific examples, other polycarboxylic acid anhydrides, or the acids, may be interacted with the polyhydric alcohol and dextran to obtain the plastic materials of the invention. As will be observed from the examples given, the properties, notably the solubilities, of these new plastic materials vary not only with the relative proportions of the reactants employed but also with the dextran selected, so that a wide variation in the characteristics of the ultimate products is possible depending on the dextran selected.

The reaction of the several ingredients may be carried out in an atmosphere of an inert gas such as carbon dioxide, nitrogen or the like, in order to inhibit darkening of the product and insure the production of pale or essentially colorless products. The inert gas may be bubbled through the reacting ingredients, the gas in that case also serving to agitate the mass and expedite removal of any water formed in the reaction.

The reaction proceeds so readily that use of a catalyst usually is not warranted. However, a suitable catalyst may be used, if desired. Examples of such useful catalysts are ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series such as benzoyl peroxide, p-chlorobenzoyl peroxide, etc., mixed organic peroxides such as acetyl benzoyl peroxide, ketone peroxides of the type of acetone peroxide, triacetone peroxide, alkyl derivatives of hydrogen peroxide including ethyl hydrogen peroxide, diethyl peroxide, various per compounds such as perborates, persulfates, perchlorates, etc., aluminum salts such as the halides, e. g., aluminum chloride. When a catalyst is employed, however, it is preferred to use benzoyl peroxide in any suitable amount and usually in a concentration of 0.1% to 1.5% by weight of the total charge.

It may also be desirable to include a polymerization inhibitor in the composition. Antioxidants such as hydroquinone, pyrogallol, tannic acid or any aromatic amine such as aniline or phenylene diamine may be employed as the inhibitor, usually in amounts between 0.01% and 0.02% on the weight of the composition.

Pigments, dyes and special effect materials including metallic particles may be mixed with the composition while it is in plastic condition.

In general, the plastic materials obtained by the interaction of the unsaturated polycarboxylic acid, polyhydric alcohol, and dextran are clear, insoluble substances which form hard, clear films that, in some cases, tend to be thermosetting. Certain of these new materials, those obtained by the interaction of the dextran with maleic or phthalic anhydride and glycerol, and those resulting from the interaction of dextran, maleic anhydride and the glycols, have properties that are on the borderline between thermoplastic and thermosetting. Those derived from glycerol exhibit more pronounced thermosetting characteristics while those derived from the glycols are more thermoplastic. The dextran generally functions, to the extent of its presence, as a coreacted diluent, to diminish the tendency to thermosetting characteristics in the case of those products which, in the absence of the dextran, would be definitely thermosettable.

Since changes and modifications may be made in details in carrying out the invention without departing from the spirit and scope thereof, it is to be understood that it is not intended to limit the invention except as defined in the appended claims.

What is claimed is:

1. A plastic material settable by cooling and formed by the interaction of by weight, from 30% to 75% of maleic anhydride and from 15% to 60% of a polyhydric alcohol selected from the group consisting of ethylene glycol, diethylene glycol, triethylene glycol, tetra-ethylene glycol, trimethylene glycol, glycerol and pentaerythritol in the presence of from 5% to 25% of dextran.

2. A plastic material settable by cooling and formed by the interaction of by weight, from 30% to 75% of phthalic anhydride and from 15% to 60% of a polyhydric alcohol selected from the group consisting of ethylene, glycol, diethylene glycol, triethylene glycol, tetra-ethylene glycol, trimethylene glycol, glycerol and pentaerythritol in the presence of from 5% to 25% of dextran.

3. A plastic material settable by cooling and formed by the interaction of by weight, from 30% to 75% of maleic anhydride and from 15% to 60% of glycerol in the presence of from 5% to 25% of dextran.

4. A plastic material settable by cooling and formed by the interaction of by weight, from 30% to 75% of maleic anhydride and from 15% to 60% of ethylene glycol in the presence of from 5% to 25% of dextran.

5. A plastic material settable by cooling and formed by the interaction of by weight, from 30% to 75% of maleic anhydride and from 15% to 60% of propylene glycol, in the presence of from 5% to 25% of dextran.

6. A plastic material settable by cooling and formed by the interaction of by weight, from 30% to 75% of phthalic anhydride and from 15% to 60% of glycerol in the presence of from 5% to 25% of dextran.

7. A plastic material settable by cooling and formed by the interaction of by weight, from 30% to 75% of phthalic anhydride and from 15% to 60% of ethylene glycol in the presence of from 5% to 25% of dextran.

8. A plastic material settable by cooling and formed by the interaction of by weight, from 30% to 75% of phthalic anhydride and from 15% to 60% of propylene glycol in the presence of from 5% to 25% of dextran.

9. A plastic material settable by cooling and formed by the interaction of from 30% to 75% by weight of a substance selected from the group consisting of alpha-unsaturated alpha, beta-polycarboxylic acids and anhydrides thereof, and from 15% to 60% by weight of a polyhydric alcohol selected from the group consisting of ethylene glycol, diethylene glycol, triethylene glycol, tetraethylene glycol, trimethylene glycol, glycerol and pentaerythritol in the presence of from 5% to 25% by weight of dextran.

10. The method of producing a plastic material which comprises heating a mixture comprising by weight, from 30% to 75% of a substance selected from the group consisting of alpha-unsaturated alpha, beta-polycarboxylic acids and anhydrides thereof and from 15% to 60% of a polyhydric alcohol selected from the group consisting of ethylene glycol, diethylene glycol, triethylene glycol, tetraethylene glycol, trimethylene glycol, glycerol, and pentaerythritol, in the presence of from 5% to 25% of dextran until a resinous fluid mass is obtained, and cooling the mass.

11. The method of producing a plastic material which comprises heating a mixture of by weight, from 30% to 75% of maleic anhydride and from 15% to 60% of a polyhydric alcohol selected from the group consisting of ethylene glycol, diethylene glycol, triethylene glycol, tetra-ethylene glycol, trimethylene glycol, glycerol, and pentaerythritol, in the presence of from 5% to 25% of dextran until a resinous fluid mass is obtained, and cooling the mass.

12. The method of producing a plastic material which comprises heating a mixture of by weight, from 30% to 75% of phthalic anhydride and from 15% to 60% of a polyhydric alcohol selected from the group consisting of ethylene glycol, diethylene glycol, triethylene glycol, tetra-ethylene glycol, trimethylene glycol, glycerol, and pentaerythritol, in the presence of from 5% to 25% of dextran until a resinous fluid mass is obtained, and cooling the mass.

13. The method of producing a plastic material which comprises heating a mixture of by weight, from 30% to 75% of maleic anhydride and from 15% to 60% of glycerol in the presence of from 5% to 25% of dextran until a resinous fluid mass is obtained, and cooling the mass.

14. The method of producing a plastic material which comprises heating a mixture of by weight, from 30% to 75% of maleic anhydride and from 15% to 60% of ethylene glycol in the presence of from 5% to 25% of dextran until a resinous fluid mass is obtained, and cooling the mass.

15. The method of producing a plastic material which comprises heating a mixture of by weight, from 30% to 75% of maleic anhydride and from 15% to 60% of propylene glycol in the presence of from 5% to 25% of dextran until a resinous fluid mass is obtained, and cooling the mass.

16. The method of producing a plastic material which comprises heating a mixture of by weight, from 30% to 75% of phthalic anhydride and from 15% to 60% of glycerol in the presence of from 5% to 25% of dextran until a resinous fluid mass is obtained, and cooling the mass.

17. The method of producing a plastic material which comprises heating a mixture of by weight, from 30% to 75% of phthalic anhydride and from 15% to 60% of ethylene glycol in the presence of from 5% to 25% of dextran until a resinous fluid mass is obtained, and cooling the mass.

18. The method of producing a plastic material which comprises heating a mixture of by weight, from 30% to 75% of phthalic anhydride and from 15% to 60% of propylene glycol in the presence of from 5% to 25% of dextran until a resinous fluid mass is obtained, and cooling the mass.

References Cited in the file of this patent

UNITED STATES PATENTS

| | | |
|---|---|---|
| 2,413,320 | Griffin et al. | Dec. 31, 1946 |
| 2,466,774 | Legg et al. | Apr. 12, 1949 |
| 2,624,768 | Toulmin | Jan. 6, 1953 |